United States Patent
Lim et al.

(10) Patent No.: US 10,187,769 B2
(45) Date of Patent: Jan. 22, 2019

(54) CONNECTIVITY SUPPORTING METHOD FOR D2D COMMUNICATION AND WIRELESS DEVICE

(71) Applicant: LG ELECTRONICS INC., Seoul (KR)

(72) Inventors: Suhwan Lim, Seoul (KR); Suckchel Yang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/536,116

(22) PCT Filed: Dec. 24, 2015

(86) PCT No.: PCT/KR2015/014267
§ 371 (c)(1),
(2) Date: Jun. 14, 2017

(87) PCT Pub. No.: WO2016/105164
PCT Pub. Date: Jun. 30, 2016

(65) Prior Publication Data
US 2017/0366919 A1  Dec. 21, 2017

Related U.S. Application Data

(60) Provisional application No. 62/096,547, filed on Dec. 24, 2014.

(51) Int. Cl.
*H04B 7/00* (2006.01)
*H04W 4/70* (2018.01)
(Continued)

(52) U.S. Cl.
CPC ......... *H04W 4/70* (2018.02); *H04W 72/0406* (2013.01); *H04W 72/0446* (2013.01); *H04W 72/12* (2013.01); *H04W 76/10* (2018.02)

(58) Field of Classification Search
CPC ....... H04W 84/18; H04W 4/02; H04W 88/02; H04W 88/06; H04W 76/02; H04W 92/02
(Continued)

(56) References Cited

U.S. PATENT DOCUMENTS 9,532,394 B2 * 12/2016 Seo ................. H04W 24/08
2009/0029645 A1 * 1/2009 Leroudier ........... H04B 7/2606
455/7
(Continued)

FOREIGN PATENT DOCUMENTS

WO   2014104627   7/2014

OTHER PUBLICATIONS

PCT International Application No. PCT/KR2015/014267, Written Opinion of the International Searching Authority dated Apr. 5, 2016, 4 pages.

(Continued)

*Primary Examiner* — Temica M Beamer
(74) *Attorney, Agent, or Firm* — Lee Hong Degerman Kang Waimey

(57) ABSTRACT

A disclosure of the present specification provides a method for supporting connectivity of device-to-device (D2D) communication between a first wireless device and a second wireless device. The method may comprise the steps of: receiving, by a third wireless device, information on a resource pool which can be used for D2D communication, from a base station; transmitting, by the third wireless device, information on a resource which can be used for D2D communication between the first wireless device and the second wireless device to the first wireless device and the second wireless device, on the basis of the received information; and performing, by the third wireless device, a procedure for providing necessary data to the second wireless device when the disconnection of the D2D communication link between the first wireless device and the second wireless device is detected.

19 Claims, 20 Drawing Sheets

(51) Int. Cl.
*H04W 76/10* (2018.01)
*H04W 72/12* (2009.01)
*H04W 72/04* (2009.01)

(58) Field of Classification Search
USPC .................................. 455/41.2, 13.1, 422.1
See application file for complete search history.

(56) References Cited

U.S. PATENT DOCUMENTS

| 2011/0194485 | A1* | 8/2011 | Horneman | .......... | H04W 72/042 |
| | | | | | 370/315 |
| 2014/0010209 | A1* | 1/2014 | Hakola | ................ | H04W 24/02 |
| | | | | | 370/336 |
| 2015/0334757 | A1* | 11/2015 | Seo | ..................... | H04W 76/023 |
| | | | | | 370/329 |
| 2016/0021483 | A1* | 1/2016 | Wei | ........................ | H04W 4/70 |
| | | | | | 455/41.2 |
| 2017/0280423 | A1* | 9/2017 | Zhao | .................... | H04W 72/04 |

OTHER PUBLICATIONS

Samsung, "Discussion on D2D Group Communication," 3GPP TSG-RAN WG1 #74, R1-133117, Aug. 2013, 7 pages.
Samsung, "Discussion on Relay Functionality for D2D Group Communication," 3GPP TSG-RAN WG1 #74, R1-133118, Aug. 2013, 4 pages.
LG Electronics, "Enhancements for Efficient Relaying Operations," 3GPP TSG-RAN WG1 #74, R1-133386, Aug. 2013, 7 pages.
Sung-Min Oh et al," Resource Allocation Scheme for D2D Communications in Multi-Cell Environments", The Journal of The Korean Institute of Communication Sciences(2014) 601-609, Oct. 2014, 11 pages.

* cited by examiner

CONNECTIVITY SUPPORTING METHOD FOR D2D COMMUNICATION AND WIRELESS DEVICE

CROSS-REFERENCE TO RELATED APPLICATIONS

This application is the National Stage filing under 35 U.S.C. 371 of International Application No. PCT/KR2015/014267, filed on Dec. 24, 2015, which claims the benefit of U.S. Provisional Application No. 62/096,547, filed on Dec. 24, 2014, the contents of which are all hereby incorporated by reference herein in its entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, 3GPP LTE-A (LTE-Advanced) evolved from 3GPP LTE has been commercialized.

Meanwhile, Device-to-device (D2D) communication is a distributed communication technique in which adjacent wireless nodes directly deliver traffic. In the D2D communication, a wireless node such as a mobile phone autonomously discovers another wireless node which is physically adjacent, establishes a communication session, and thereafter transmits traffic.

D2D communication, such as Bluetooth (Bluetooth) or WiFi Direct supports direct communication between the wireless nodes without the support of the base station. Further, it is also possible that communication D2D scheduling is managed by the base station for D2D communication. Thus, D2D communication managed by the base station to spread traffic from concentrating in the base station can reduce the traffic overload problem.

Generally, D2D communication between wireless nodes may be performed with a relatively low transmission power as the distance between wireless nodes is shorter. However, even if the base station checks the D2D communication state and manages the resource pools, it is difficult to directly monitor the D2D communication link performing the communications with the low power.

SUMMARY OF THE INVENTION

The present invention provides a connectivity support method for D2D communication and a connectivity support wireless device for D2D communication.

In one aspect of the present invention, there is provided a method for supporting connectivity of D2D (Device-to-Device) communication between a first wireless device and a second wireless device, the method comprising: receiving, by a third wireless device, first information on a resource pool available for D2D communication from a base station; transmitting, by the third wireless device, second information on a resource pool available for D2D communication between the first wireless device and the second wireless device to the first wireless device and the second wireless device, wherein the second information is based on the first information; and performing, by the third wireless device, a procedure for providing required data to the second wireless device when the third wireless device detects that the D2D communication link between the first wireless device and the second wireless device is terminated.

In one embodiment, the third wireless device is located in a cell coverage extension area of the base station, wherein the first wireless device and the second wireless device are out of the cell coverage extension area.

In one embodiment, the first information is received repeatedly from the base station using a plurality of subframes.

In one embodiment, the procedure for providing the required data to the second wireless device includes: receiving, the third wireless device, the required data from the first wireless device before the D2D communication link between the first wireless device and the second wireless device is terminated; and transmitting, the third wireless device, the received required data to the second wireless device.

In one embodiment, the procedure for providing the required data to the second wireless device includes: the third wireless device searching for a fourth wireless device adjacent to the second wireless device, wherein the fourth wireless device has received the required data before the D2D communication link between the first wireless device and the second wireless device is terminated; and upon detection of the fourth wireless device, transmitting, by the third wireless device, to the fourth wireless device, a control signal for instructing the fourth wireless device to transmit the required data to the second wireless device.

In one embodiment, the procedure for providing the required data to the second wireless device includes: upon the second wireless device broadcasting a data request message, determining, by the third wireless device, whether the data request message reaches a fourth wireless device containing the necessary data; and upon determination that the data request message does not reach the fourth wireless device, sending, by the third wireless device, a power adjustment signal to the second wireless device to instruct the second wireless device to increase transmission power for the data request message.

In one embodiment, the procedure for providing the required data to the second wireless device includes: determining, by the third wireless device, whether a fourth wireless device having the required data is located in a first area where the first information cannot be received directly from the base station; upon determination that the fourth wireless device is located in the first area, updating, by the third wireless device, the resource pool so that a D2D communication link is established between the second wireless device and the fourth wireless device; and sending, by the third wireless device, the updated resource pool to the second wireless device.

In one embodiment, the procedure for providing the required data to the second wireless device includes: receiving, by the third wireless device, support priorities for devices supporting the connectivity of the D2D communication from the second wireless device; and upon determination, based on the received support priorities, that the third wireless device is a device to support the connectivity of the D2D communication, transmitting, by the third wireless device, the required data to the second wireless device.

In one embodiment, the method further comprises: after transmitting the second information to the first wireless device and the second wireless device, upon detection of a collision between scheduling assignments for the D2D communication between the first wireless device and the second wireless device, reconstructing, the third wireless device, the resource pool so that the collision is prevented; and transmitting, by the third wireless device, the reconstructed resource pool to the first wireless device and/or the second wireless device.

In another aspect of the present invention, there is provided a support device for supporting connectivity of D2D (Device-to-Device) communication between a first wireless device and a second wireless device, the support device comprising: a radio frequency (RF) unit; and a processor coupled to the RF unit to control the RF unit, wherein the processor is configured: to control the RF unit to receive first information on a resource pool available for D2D communication from a base station; to transmit second information on a resource pool available for D2D communication between the first wireless device and the second wireless device to the first wireless device and the second wireless device, wherein the second information is based on the first information; and to perform a procedure for providing required data to the second wireless device upon detecting that the D2D communication link between the first wireless device and the second wireless device is terminated.

In accordance with the present disclosure, it is possible to increase the connectivity of the communication link for D2D communication.

DETAILED DESCRIPTIONS

Figure 1:
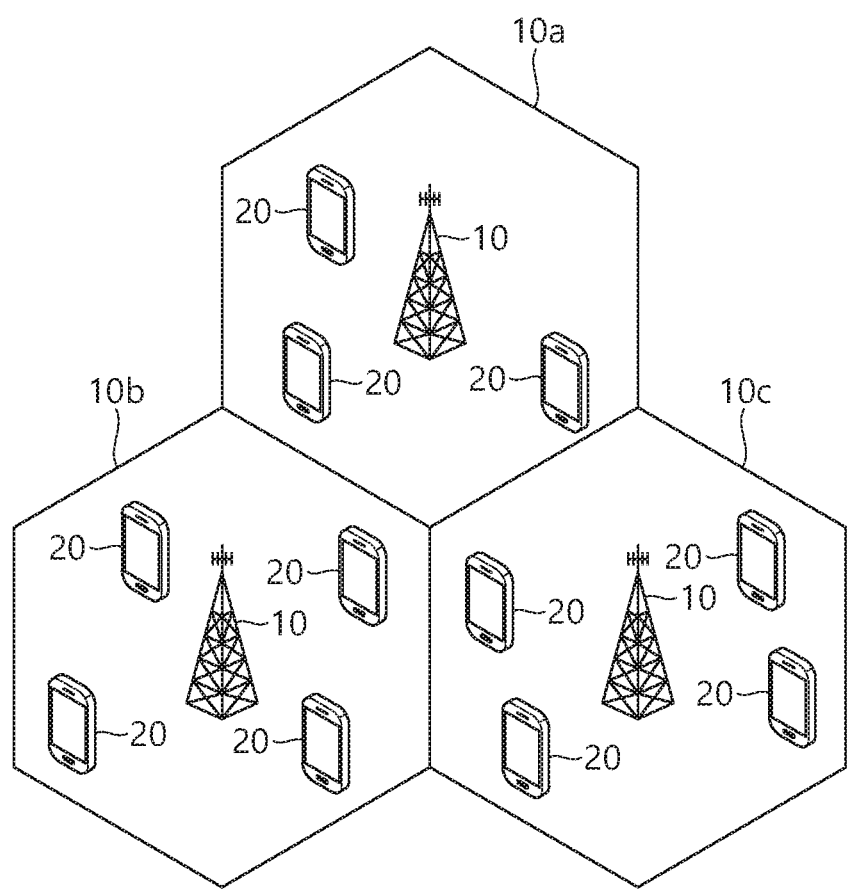
FIG. 1 shows a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems such as IEEE (Institute of Electrical and Electronics Engineers) 802.11, IEEE 802.16, IEEE 802.16e or IEEE 802.15.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 10. Respective BSs 10 provide a communication service to particular geographical areas 10a, 10b, and 10c (which are generally called cells).

The terminal 20 generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 10 to the terminal 20 and an uplink means communication from the terminal 20 to the base station 10. In the downlink, a transmitter may be a part of the base station 10 and a receiver may be a part of the terminal 20. In the uplink, the transmitter may be a part of the terminal 20 and the receiver may be a part of the base station 10.

Figure 2:
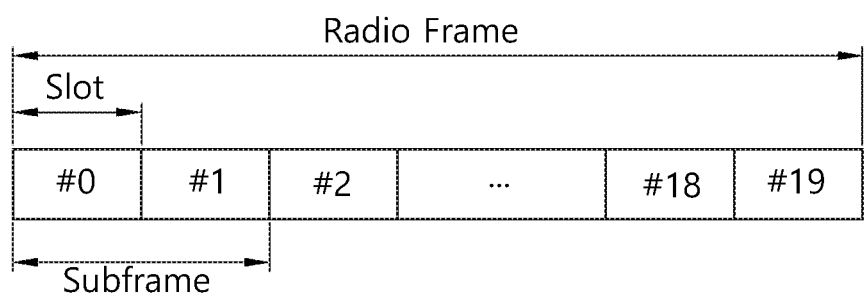
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
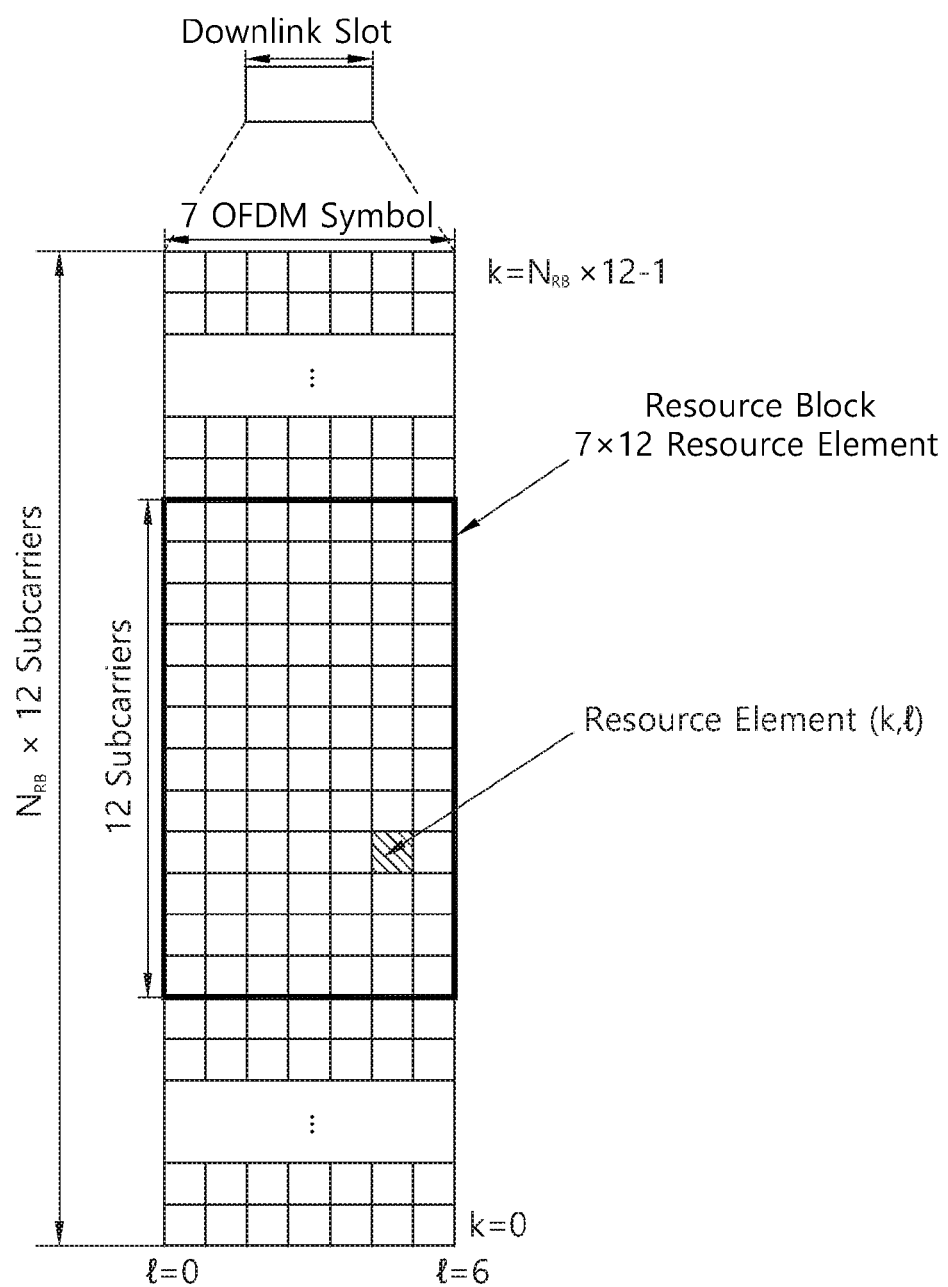
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

On the other hand, the number of subcarriers in one OFDM symbol may be used by selecting one of the 128, 256, 512, 1024, 1536 and 2048.

The resource grid for one uplink slot in a 3GPP LTE of FIG. 3 may also be applied to a resource grid for a DL slot.

Figure 4:
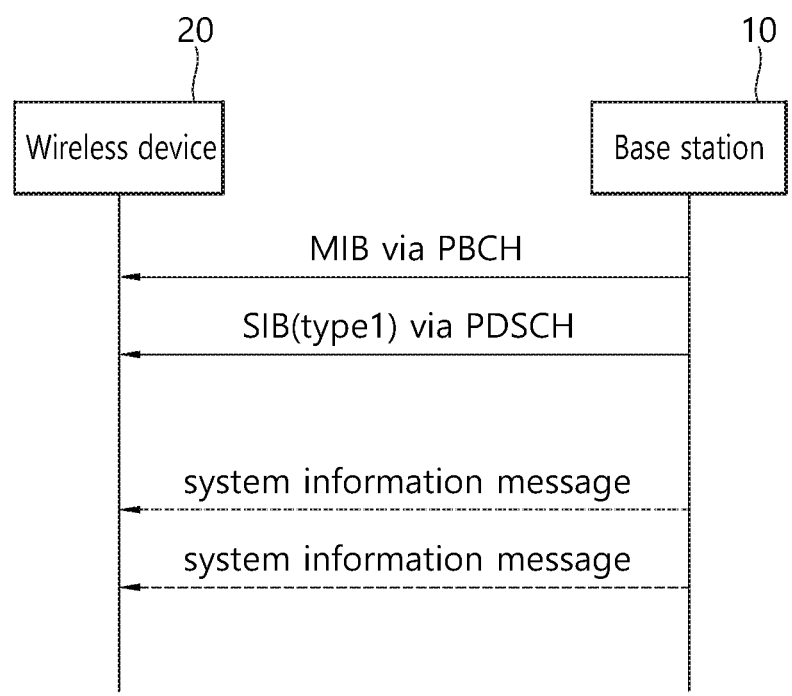
FIG. 4 shows an example of transmission of system information.

FIG. 4 shows an example of transmission of system information.

The system information is divided into a master information block (MIB) and a plurality of system information blocks (SIB). The MIB includes the most important physical layer information of the cell. There are several types of SIBs. The first type of SIB contains information used to evaluate whether a wireless device 20 is allowed to access the cell and also includes scheduling information for other types of SIBs. A second type of SIB (SIB type 2) includes common and shared channel information. A third type of SIB (SIB type 3) includes cell reselection information that is primarily associated with the serving cell. A fourth type of SIB (SIB type 4) includes frequency information of a serving cell and intra-frequency information of a neighboring cell related to cell reselection. A fifth type of SIB (SIB type 5) includes information on another E-UTRA frequency and information on an inter-frequency of a neighboring cell associated with cell reselection. A sixth type of SIB (SIB type 6) includes information on UTRA frequency and information on an UTRA neighbor cell related to cell reselection. A seventh type of SIB (SIB type 7) contains information on a GERAN frequency associated with cell reselection.

As can be seen with reference to FIG. 4, the MIB is delivered to the wireless device 20 over PBCH. Further, the first type SIB (SIB type 1) is mapped to DL-SCH, which is then transmitted to the radio device 20 over PDSCH. The remaining types of SIBs are delivered to the wireless device over PDSCH via a System Information message.

<Cell Coverage Extension>

Figure 5A:
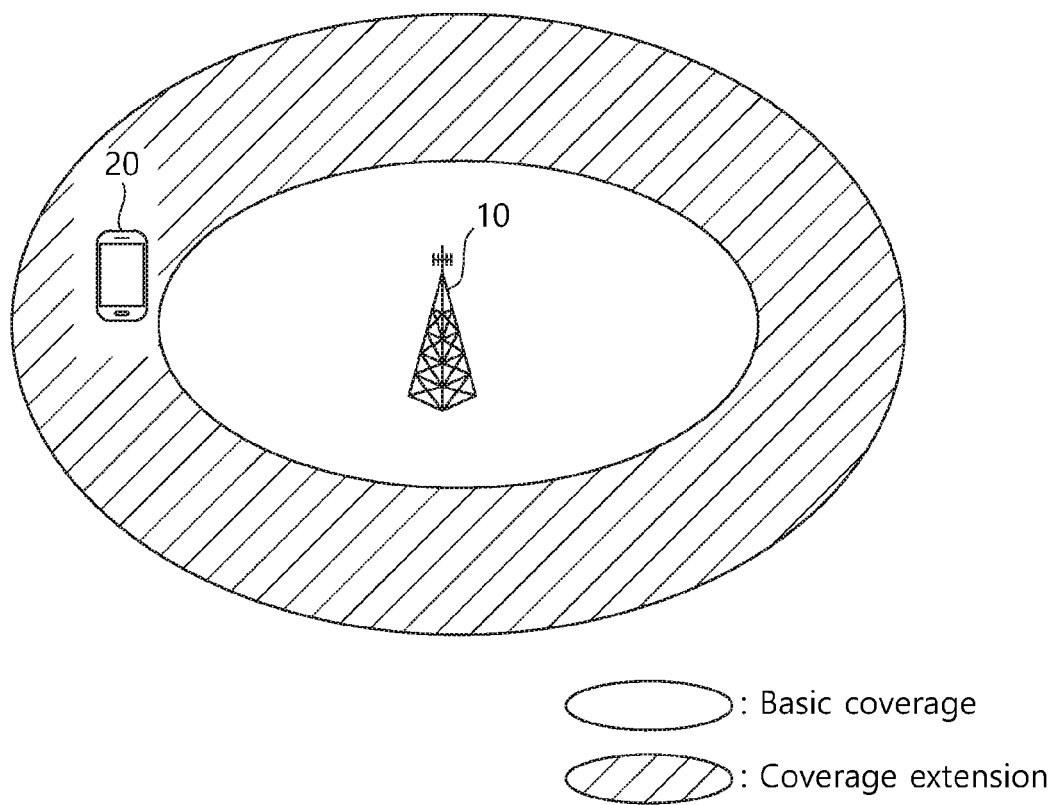
FIG. 5A is an illustration of cell coverage extension.

FIG. 5A is an illustration of cell coverage extension.

In recent years, it is considered to extend or enhance the coverage of a base station for the wireless device 20. In this connection, various techniques for extending the cell coverage are being discussed.

However, when the coverage of the cell is extended, and if the base station 10 transmits the downlink channel to the wireless device 20 located in the coverage extension area, the wired device 20 has difficulty in receiving the downlink channel.

Figure 5B:
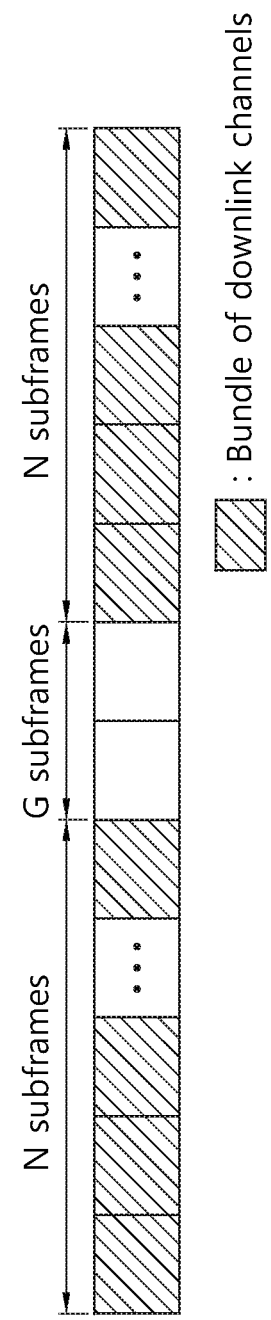
FIG. 5B is an exemplary diagram illustrating an example of transmitting a bundle of downlink channels.

FIG. 5B is an exemplary diagram illustrating an example of transmitting a bundle of downlink channels.

Referring to FIG. 5B, the base station 10 repeatedly transmits downlink channels (e.g., PBCH, PDCCH, PDSCH) to the wireless device 20 located in the coverage extension area using a plurality of subframes (e.g., N subframes). In this connection, the downlink channels repeatedly transmitted using the plurality of subframes are referred to as a bundle of downlink channels.

Meanwhile, the wireless device 20 may receive the bundle of the downlink channels using the subframes and decode some or all of the bundle of the downlink channels, thereby to increase the decoding success rate.

<D2D (Device to Device) Communication>

On the other hand, the D2D communication expected to be introduced in the next generation communication system will be described below.

Figure 6:
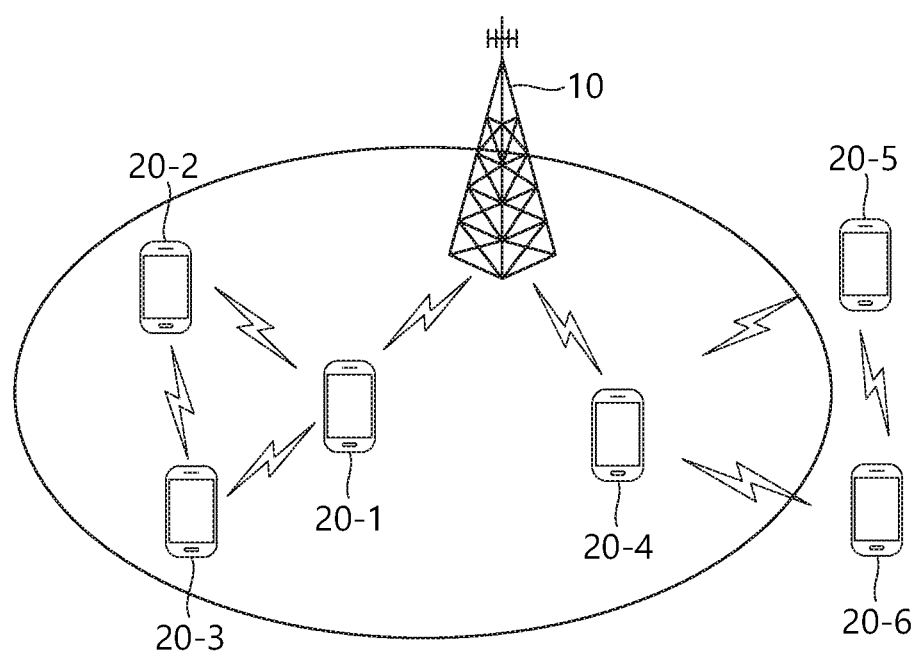
FIG. 6 shows concept of D2D (Device to Device) communication expected to be introduced in the next generation communication system.

FIG. 6 shows concept of D2D (Device to Device) communication expected to be introduced in the next generation communication system.

Due to the increased user requirements for SNS (Social Network Service), communication between physically-close wireless devices, that is, D2D (Device to Device) communication, has been required.

In order to reflect the above-described requirements, a scheme as shown in FIG. 6 is discussed which allows direct communication between a first wireless device 20-1, a second wireless device 20-2, and a third wireless device 20-3, direct communication between a fourth wireless device 20-4, a fifth wireless device 20-5 and a sixth wireless device 20-6, without the intervention of the base station 10. Of course, with the aid of the base station 10, it is possible to communicate directly between the first wireless device 20-1 and the fourth wireless device 20-4. Meanwhile, the first wireless device 20-1 may serve as a repeater for the second wireless device 20-2 and the third wireless device 20-3. Similarly, the fourth wireless device 20-4 may act as a repeater for the fifth wireless device 20-5, the sixth wireless device 20-6, which is far from the cell center.

In this connection, a link between the wireless devices used in the D2D communication is also called a sidelink.

In this connection, physical channels used for the sidelink are as follows:

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

As described above, it is discussed that the D2D communication between the wireless devices will be introduced in the next communication system.

Figure 7:
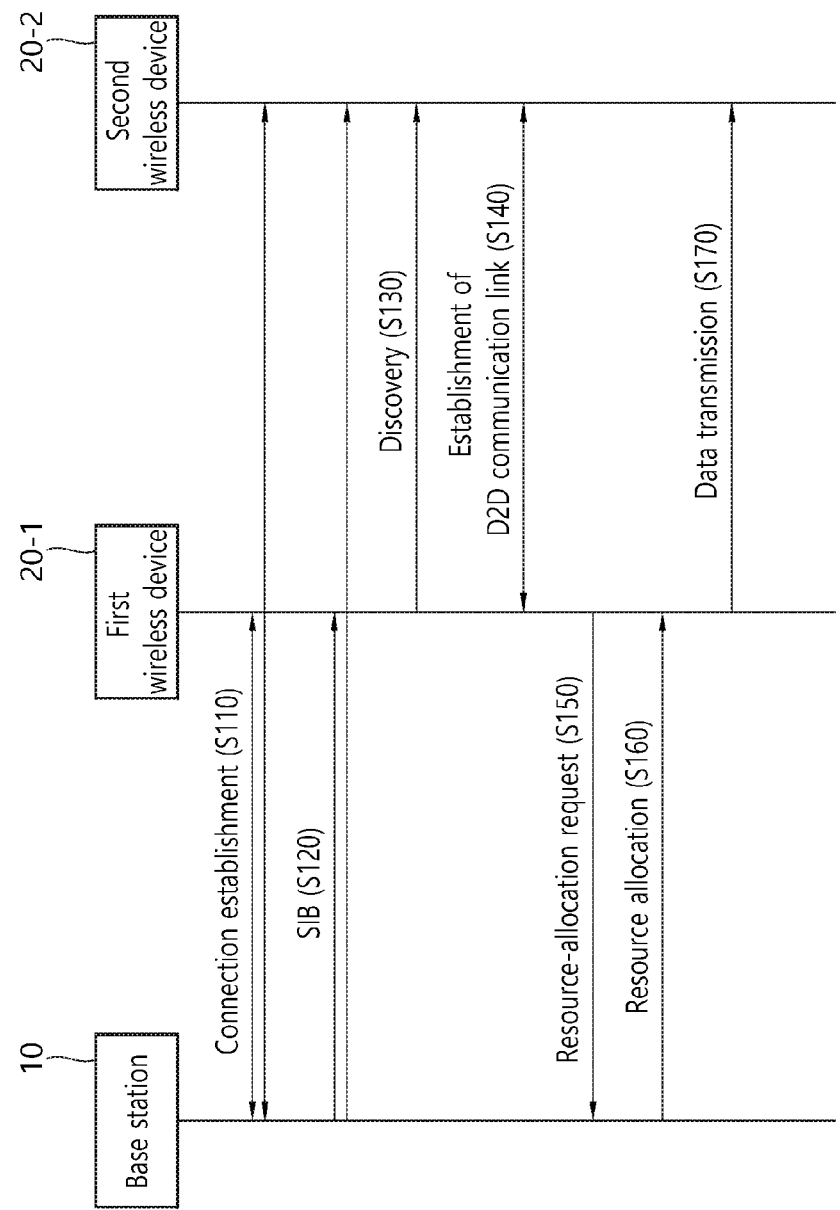
FIG. 7 shows an outline of D2D communication.

FIG. 7 shows an outline of D2D communication.

Referring to FIG. 7, each of the first wireless device 20-1 and the second wireless device 20-2 establishes connection with the base station 10 (S110). For example, each of the first wireless device 20-1 and the second wireless device 20-2 may establish an RRC connection.

Each of the first wireless device 20-1 and the second wireless device 20-2 receives a system information block (SIB) broadcasted by the base station 10 (S120).

The SIB may include information about resource pools associated with the D2D communication. The information on the resource pools related to the D2D communication may be classified into SIB type 18 and SIB type 19.

The SIB type 18 indicates a network supporting the D2D communication procedure, and may include resource setting information for the D2D communication. The SIB type 18 may include following fields.

CommRxPool indicates resources assigned to the wireless device to receive the D2D communication in a RRC_IDLE state and a RRC_CONNECTED state.

CommSyncConfig indicates resources assigned to the wireless device to transmit or receive synchronization information.

CommTxPoolExceptional indicates resource assigned to the wireless device to send the D2D communication in an exceptional state.

CommTxPoolNormalCommon indicates resources assigned to the wireless device to transmit the D2D communication in the RRC_CONNECTED state or in the RRC_IDLE state, during the D2D transmission over a frequency except a primary frequency.

The SIB type 19 indicates a network supporting the D2D communication procedure and may include resource setting information related to D2D direct discovery. The SIB type 19 may include following fields.

DiscInterFreqList indicates adjacent frequencies supported for the D2D direct-discovery notification.

DiscRxPool indicates resources assigned to the wireless device to receive the D2D direct discovery notification in RRC_ILE state and RRC_CONNECTED state.

DiscSyncConfig indicates resources assigned to the wireless device to transmit or receive synchronization information.

DiscTxPoolCommon indicates resources assigned to the wireless device to send the D2D direct discovery notification in the RRC_IDLE state.

Plmn-IdentityList is a list of PLMN identifiers for adjacent frequencies indicated by the carrier frequency.

Plmn-Index is an index associated with an entry in the plmn-IdentityList field.

The first wireless device 20-1 performs a discovery for identifying another wireless device based on information on the resource pools included in the received SIB (S130). More specifically, the first wireless device 20-1 may broadcast a D2D discovery notification including its identification information and a synchronization signal. Then, the second wireless device 20-2 may receive the D2D discovery notification broadcasted by the first wireless device 20-1 to establish a D2D communication link (S140).

The first wireless device 20-1 requests the base station 10 to allocate resources for transmitting data to the second wireless device 20-2 (S150). In a response, the base station 10 allocates resources for transmitting the data and provides the resources to the first wireless device 20-1 (S160).

The first wireless device 20-1 transmits data to the second wireless device 20-2 based on the resources allocated by the base station 10 (S170).

Figure 8:
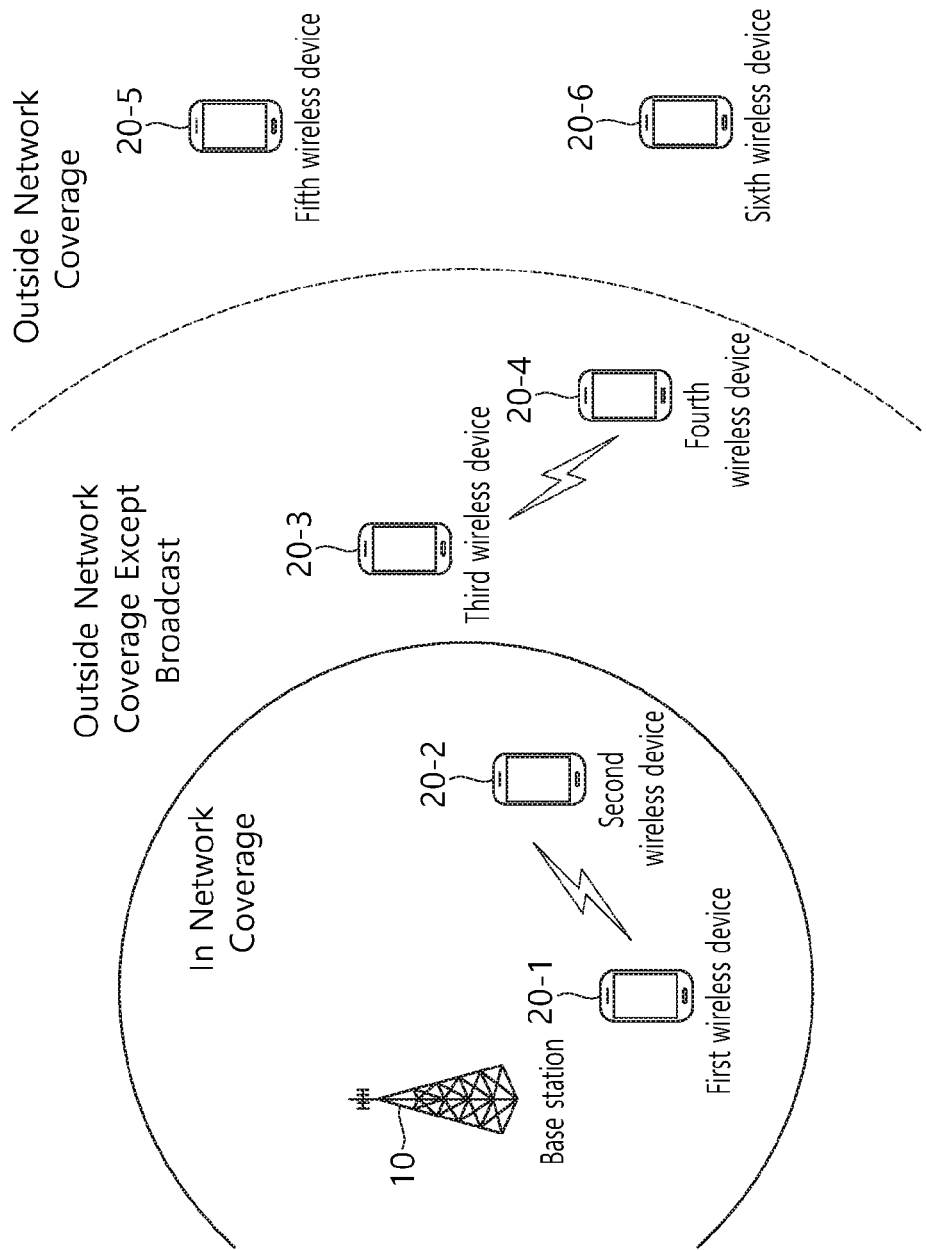
FIG. 8 shows an example of a D2D communication system in which a plurality of wireless devices are distributed.

FIG. 8 shows an example of a D2D communication system in which a plurality of wireless devices are distributed.

Referring to FIG. 8, a plurality of wireless devices 20-1, 20-2, 20-3, 20-4, 20-5, and 70 may be distributed in the D2D communication system.

A first wireless device 20-1 and a second wireless device 20-2 are wireless devices connected to the base station 10 as a serving cell. The first wireless device 20-1 and the second wireless device 20-2 are allocated resources for D2D communication from the base station 10 and may perform the D2D communication using the allocated resources. As described above, a region where the wireless device can be connected to the base station 10 as the serving cell is referred to as INC (In Network Coverage) region. The wireless device located in the INC region is referred to as an INC wireless device. In this connection, it may be understood that the INC corresponds to the basic coverage region shown in FIG. 5A.

Each of the first wireless device 20-1 and the second wireless device 20-2 located in the INC region may perform conventional cell detection and RACH (Random Access Channel) procedure. Each of the first wireless device 20-1 and the second wireless device 20-2 may receive a wireless device identifier (for example, a C-RNTI (Cell-Radio Network Temporary Identifier)) from the base station 10, and may perform downlink reception and uplink transmission using the wireless device identifier.

A third wireless device 20-3 and a fourth wireless device 20-4 may receive only messages broadcasted by the base station 10. The base station 10 cannot normally receive uplink signals transmitted by the third wireless device 20-3 and the fourth wireless device 20-4. In this way, a region where the wireless devices may receive only the messages broadcasted by the base station 10, and the base station 10 cannot normally receive the uplink signals from the wireless devices is referred to as an ONC-B (Outside Network Coverage except Broadcast) region. A wireless device that is located in the ONC-B area but not in the INC area is called an ONC-B wireless device. In this connection, it is appreciated that the ONC-B region corresponds to the extended coverage region shown in FIG. 5A.

The base station 10 may not know the presence of the third wireless device 20-3 and the fourth wireless device 20-4 located in the ONC-B region. Thus, in order to support D2D communication for the ONC-B wireless devices, the base station 10 may broadcast information about resource pools that ONC-B wireless devices may use for the D2D communication. The ONC-B wireless devices receiving the broadcast message may arbitrarily select resources to be used for D2D signal transmission from the received resource pool. Thus, the ONC-B wireless devices may perform the D2D communication using the arbitrarily selected resources.

Further, the D2D communication may be performed between the second wireless device 20-2 and the third wireless device 20-3. Thus, D2D communication performed between a wireless device located in the INC area and a wireless device located in the ONC-B area is referred to as D2D communication in a PNC (Partial Network Coverage) environment.

A fifth wireless device 20-5 and a sixth wireless device 70 are unable to receive any types of downlink signals from the base station 10. The base station 10 cannot receive any types of uplink signals from the fifth wireless device 20-5 and the seventh wireless device 70. In this way, an area where any types of the downlink or uplink cannot be established between the wireless devices and the base station 10 is referred to as ONC (Outside Network Coverage) area or region. A wireless device that is located in the ONC area but not in the ONC-B and INC areas is called an ONC wireless device.

In the case of the conventional D2D communication managed by the base station 10, information including allocation statistics of resource blocks or subframes used for the D2D communication by the base station 10, a power level measurement for each resource, and the number of wireless devices using the resources are monitored. However, as compared to the communication between the base station 10 and the wireless device, the D2D communication may be implemented with lower power as the wireless devices are located in a boundary area of the cell as a distance between the wireless devices performing the D2D communication is smaller. Therefore, when the base station 10 intends to check the D2D communication status and manage the resource pools, it may be difficult for the base station 10 to directly monitor the D2D communication link where the D2D communication is performed with such low power.

DISCLOSURE OF THE PRESENT INVENTION

Accordingly, a D2D communication system according to an embodiment of the disclosure of the present disclosure may be configures such that a wireless device having D2D communication capability supports connectivity of D2D communication performed between other wireless devices. In this connection, the wireless device supporting the connectivity of the D2D communication performed between the other wireless devices is referred to a DAD (D2D Assisting Device).

Figure 9:
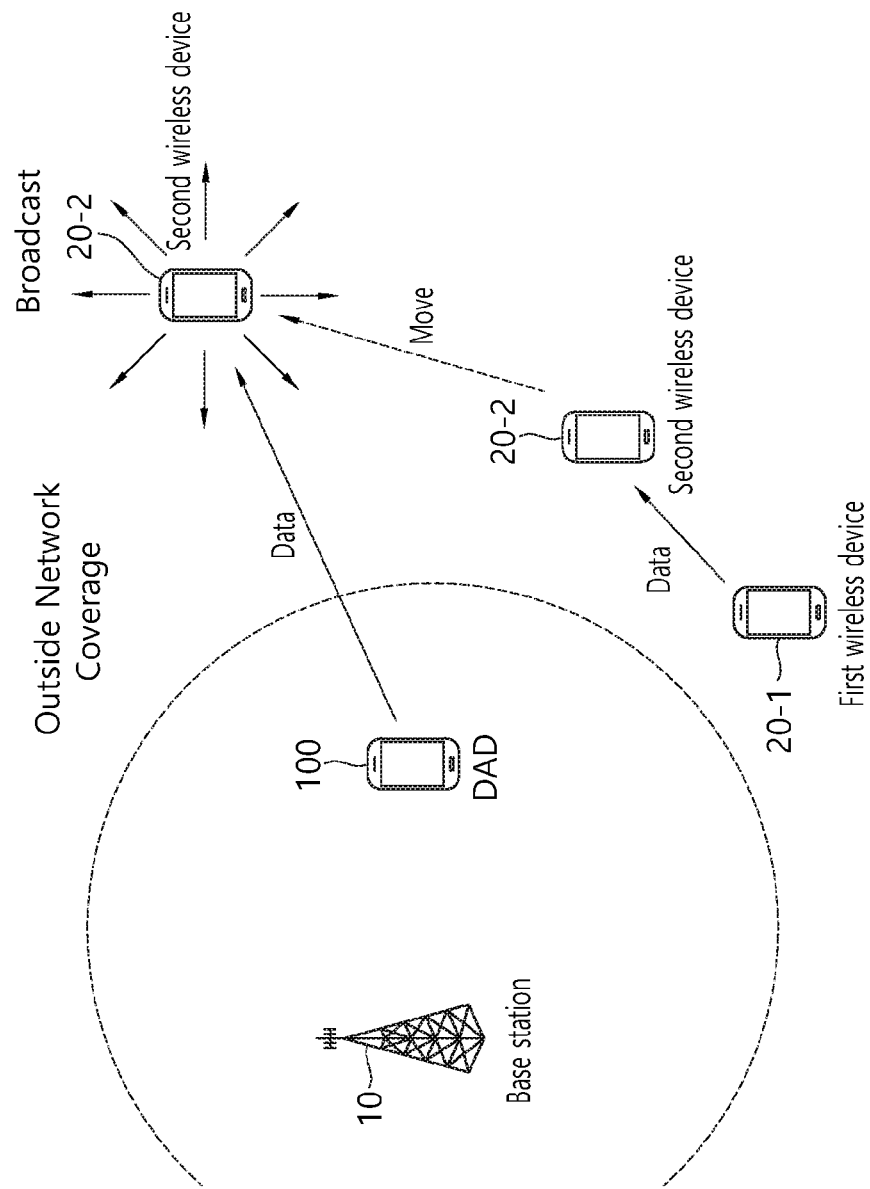
FIG. 9 shows an example in which a hidden DAD supports the connectivity of the D2D communication.

FIG. 9 shows an example in which a hidden DAD supports the connectivity of the D2D communication.

According to FIG. 9, it is assumed that a first wireless device 20-1 and a second wireless device 20-2 are performing the D2D communication with each other in a state where the first wireless device 20-1 and second wireless device 20-2 is not aware of the presence of a DAD 100. Further, it is assumed that using the D2D communication, the first wireless device 20-1 transmits data to the second wireless device 20-2, and the second wireless device 20-2 receives the data to the first wireless device 20-1.

The DAD 100 monitors the D2D communication between the first wireless device 20-1 and the second wireless device 20-2.

When one of the first wireless device 20-1 and the second wireless device 20-2 moves such that the D2D communication link is terminated, the second wireless device 20-2 broadcasts a data request message. In this connection, the broadcast data request message is standardized in the predefined message format and is transmitted to unspecified recipients as targets. The predefined message format may be scrambled with a predefined Radio Network Temporary Identifier (RNTI) and/or a VCID (Virtual Caller IDentifier), may be accompanied by a predefined pilot pattern, or may include predefined recipient information.

Upon receiving the broadcast data request message, the DAD 100 transmits data to the second wireless device 20-2 on behalf of the first wireless device 20-1. Necessary data transmitted by the DAD 100 is received from the first wireless device 20-1 in advance before the D2D communication link between the first wireless device 20-1 and the second wireless device 20-2 is terminated. Then, the necessary data is transmitted from the DAD 100 to the second wireless device 20-2.

Accordingly, the DAD 100 may support the connectivity of the D2D communication in the hidden state so that the second wireless device 20-2 may continuously receive the data.

Figure 10:
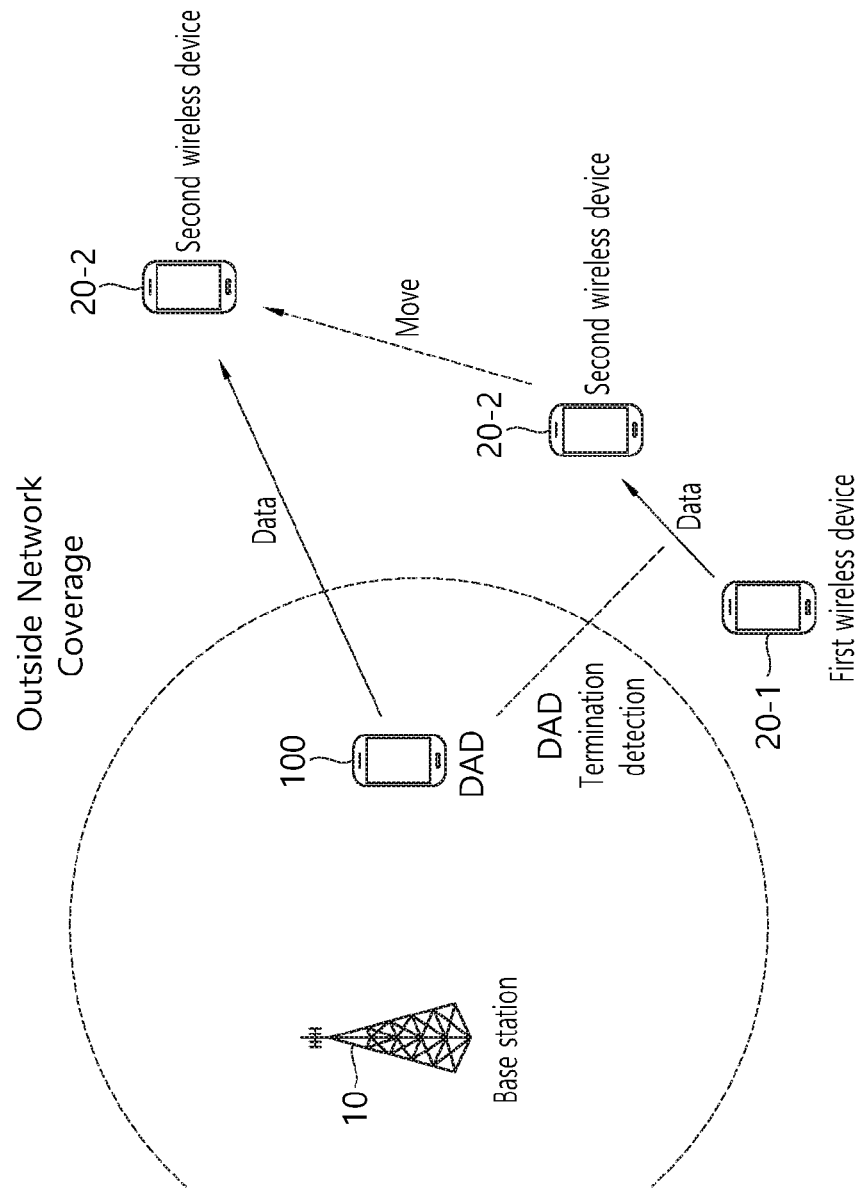
FIG. 10 shows another example in which a hidden DAD supports the connectivity of the D2D communication.

FIG. 10 shows another example in which a hidden DAD supports the connectivity of the D2D communication.

According to FIG. 10, it is assumed that the first wireless device 20-1 and the second wireless device 20-2 are performing the D2D communication with each other in a state where the first wireless device 20-1 and second wireless device 20-2 is not aware of the presence of a DAD 100. Further, it is assumed that using the D2D communication, the first wireless device 20-1 transmits data to the second wireless device 20-2, and the second wireless device 20-2 receives the data to the first wireless device 20-1.

The DAD 100 monitors the D2D communication between the first wireless device 20-1 and the second wireless device 20-2.

When one of the first wireless device 20-1 and the second wireless device 20-2 moves such that the D2D communication link is terminated, the DAD 100 detects that the D2D communication link between the first wireless device 20-1 and the second wireless device 20-2 has been terminated.

Upon detecting the release of the D2D communication link, the DAD 100 transmits the necessary data to the second wireless device 20-2 on behalf of the first wireless device 20-1. Accordingly, the DAD 100 may support the connectivity of the D2D communication in the hidden state so that the second wireless device 20-2 may continuously receive the data.

Figure 11:
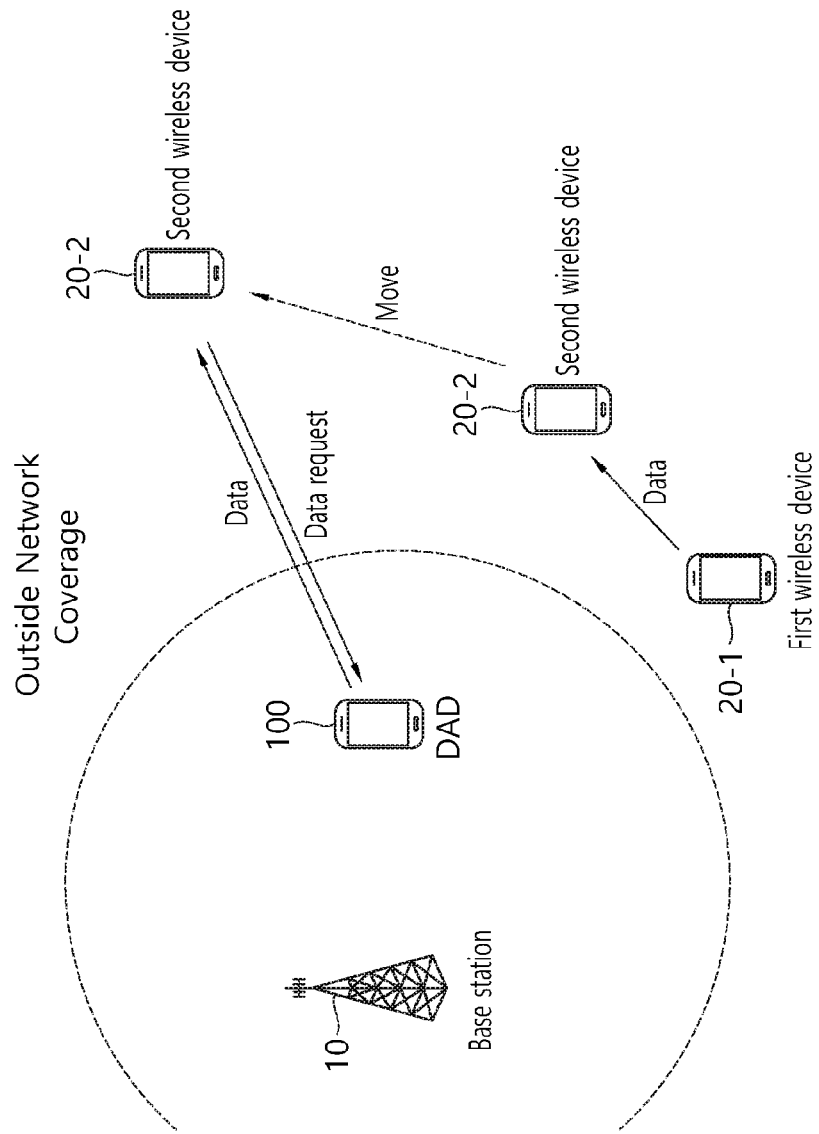
FIG. 11 shows an example in which an unhidden DAD supports the connectivity of the D2D communication.

FIG. 11 shows an example in which an unhidden DAD supports the connectivity of the D2D communication.

According to FIG. 11, it is assumed that the first wireless device 20-1 and the second wireless device 20-2 are performing the D2D communication with each other in a state where the first wireless device 20-1 and second wireless device 20-2 is aware of the presence of a DAD 100. Further, it is assumed that using the D2D communication, the first wireless device 20-1 transmits data to the second wireless device 20-2, and the second wireless device 20-2 receives the data to the first wireless device 20-1.

The DAD 100 monitors the D2D communication between the first wireless device 20-1 and the second wireless device 20-2.

When one of the first wireless device 20-1 and the second wireless device 20-2 moves such that the D2D communication link is terminated, the second wireless device 20-2 determines which DAD 100 the second wireless device 20-2 transmits a data request message to. More specifically, the second wireless device 20-2 may in advance maintain additional connections with one or more DADs 100 located in the vicinity thereof. The second wireless device 20-2 may collect information related to the connection states with said one or more DADs 100. The second wireless device 20-2 may determine priorities between the one or more DADs 100, depending on the qualities of the collected connection states. In this connection, based on the priorities, said one or more DADs 100 may provide the connectivity support for the D2D communication between the wireless devices. Such priorities may be assigned to said one or more DADs 100. Each of said one or more DADs 100 may determine, based on a corresponding assigned priority, whether it should intervene in a situation where connectivity support for the D2D communication is required. Then, the second wireless device 20-2 may determine which DAD 100 the second wireless device 20-2 transmits the data request message to, based on the priorities.

The second wireless device 20-2 transmits the data request message to the determined DAD 100. Upon receiving the data request message, the DAD 100 transmits the necessary data to the second wireless device 20-2 on behalf of the first wireless device 20-1. Accordingly, the DAD 100 may support the connectivity of the D2D communication in the unhidden state so that the second wireless device 20-2 may continuously receive the data.

Figure 12:
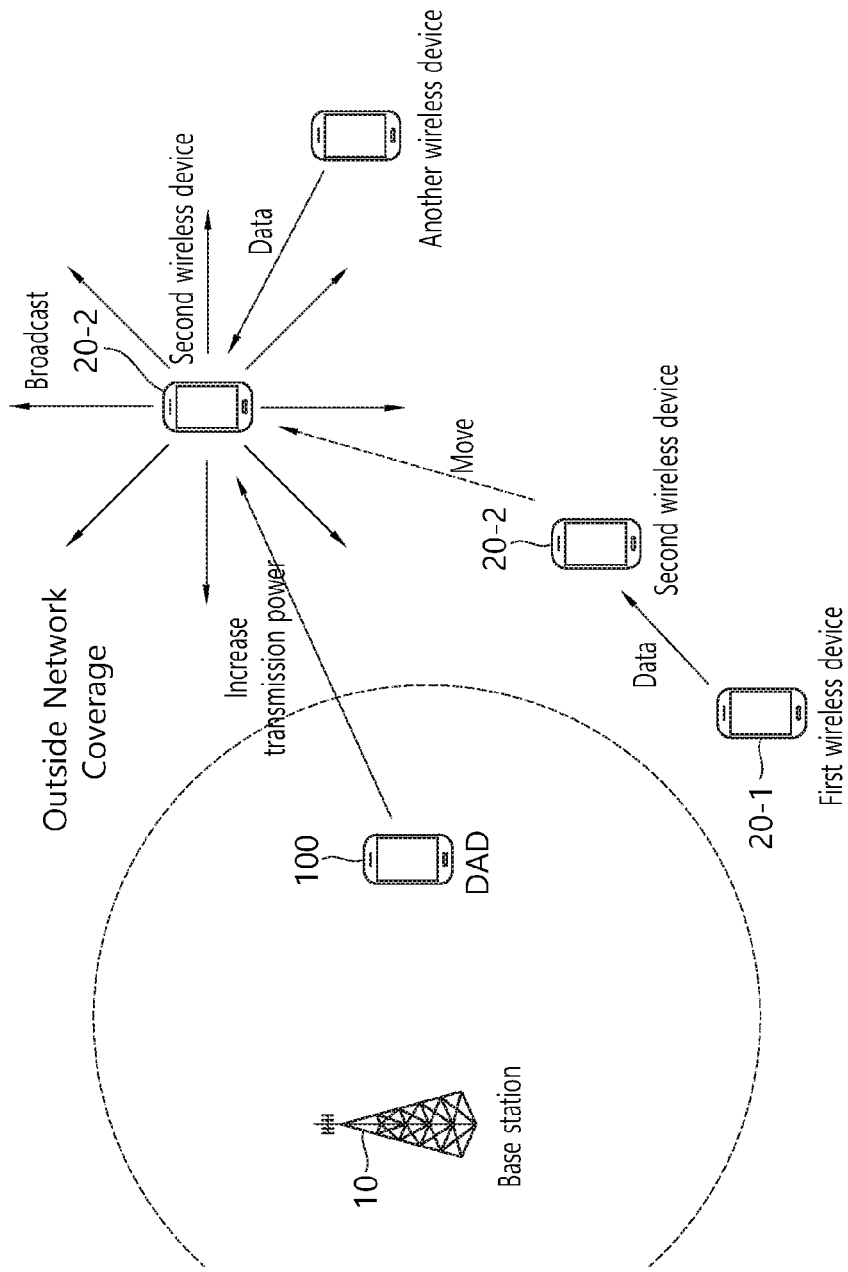
FIG. 12 shows another example in which an unhidden DAD supports the connectivity of the D2D communication.

FIG. 12 shows another example in which an unhidden DAD supports the connectivity of the D2D communication.

According to FIG. 12, it is assumed that the first wireless device 20-1 and the second wireless device 20-2 are performing the D2D communication with each other in a state where the first wireless device 20-1 and second wireless device 20-2 is aware of the presence of a DAD 100. Further, it is assumed that using the D2D communication, the first wireless device 20-1 transmits data to the second wireless device 20-2, and the second wireless device 20-2 receives the data to the first wireless device 20-1. Moreover, it is assumed that the DAD 100 does not have the data that the second wireless device 20-2 is receiving, while another wireless device adjacent to the second wireless device 20-2 has the data that the second wireless device 20-2 is receiving.

The DAD 100 monitors the D2D communication between the first wireless device 20-1 and the second wireless device 20-2.

When one of the first wireless device 20-1 and the second wireless device 20-2 moves such that the D2D communication link is terminated, the second wireless device (20-2) broadcasts a data request message.

When the data request message broadcast by the second wireless device 20-2 does not reach said another wireless device that has the data that the second wireless device 20-2 just was receiving, the DAD 100 sends a power adjustment signal to the second wireless device 20-2 to instruct the second wireless device (20-2) to increase a transmission power for the data request message.

Upon receiving the power adjustment signal, the second wireless device (20-2) raises the transmission power and broadcasts the data request message again with the increased transmission power. Thus, the data request message broadcast by the second wireless device 20-2 may reach said another wireless device that has the data that the second wireless device 20-2 just was receiving. In a response, said another wireless device may send the data to the second wireless device 20-2, which, in turn, may receive the necessary data. Accordingly, the DAD 100 may support the connectivity of the D2D communication in the unhidden state so that the second wireless device 20-2 may continuously receive the data.

Figure 13:
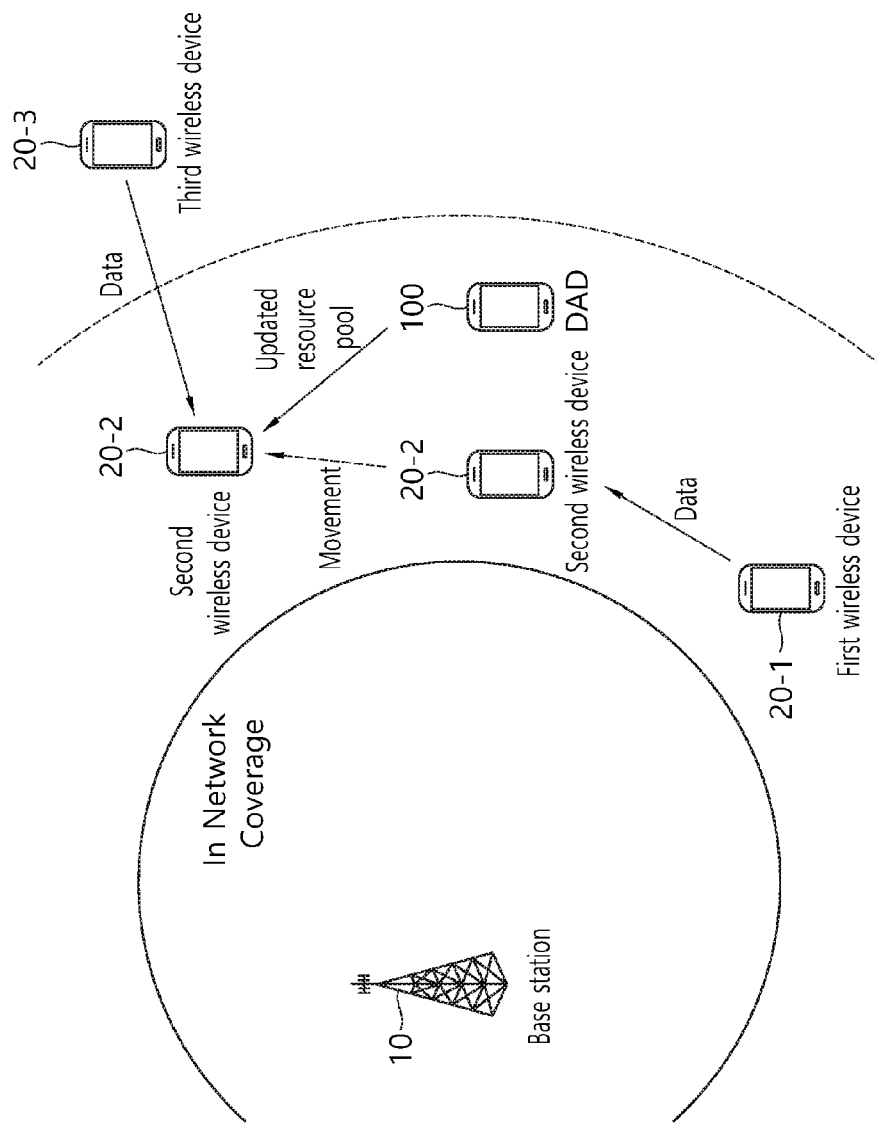
FIG. 13 shows still another example in which an unhidden DAD supports the connectivity of the D2D communication.

FIG. 13 shows still another example in which an unhidden DAD supports the connectivity of the D2D communication.

According to FIG. 13, it is assumed that the first wireless device 20-1 and the second wireless device 20-2 are performing the D2D communication with each other in a state where the first wireless device 20-1 and second wireless device 20-2 is aware of the presence of a DAD 100. Further, it is assumed that using the D2D communication, the first wireless device 20-1 transmits data to the second wireless device 20-2, and the second wireless device 20-2 receives the data to the first wireless device 20-1. Moreover, it is assumed that the DAD 100 does not have the data that the second wireless device 20-2 is receiving, while a third wireless device 20-3 has the data that the second wireless device 20-2 is receiving. Furthermore, it is assumed that the third wireless device 20-3 is located in an area where it cannot directly receive information on the resource pools from the base station 10.

The DAD 100 monitors the D2D communication between the first wireless device 20-1 and the second wireless device 20-2.

When one of the first wireless device 20-1 and the second wireless device 20-2 moves such that the D2D communication link is terminated, the second wireless device (20-2) broadcasts a data request message.

The DAD 100 updates the information about the resource pools so that the D2D communication link can be connected between the third wireless device 20-3 and the second wireless device 20-2. Then, the DAD 100 sends the updated information to the second wireless device 20-2.

The second wireless device (20-2) again broadcasts the data request message based on the updated information about the resource pools. Upon receiving the data request message, the third wireless device (20-3) may establish a new D2D communication link with the second wireless device (20-2). Then, the second wireless device 20-2 receives the necessary data from the third wireless device 20-3.

When the DAD 100 is located in the INC area or moved into the INC area, the DAD 100 reports the updated information on the resource pools to the base station 10. Accordingly, the DAD 100 may support the connectivity of the D2D communication in the unhidden state so that the second wireless device 20-2 may continuously receive the data.

Figure 14:
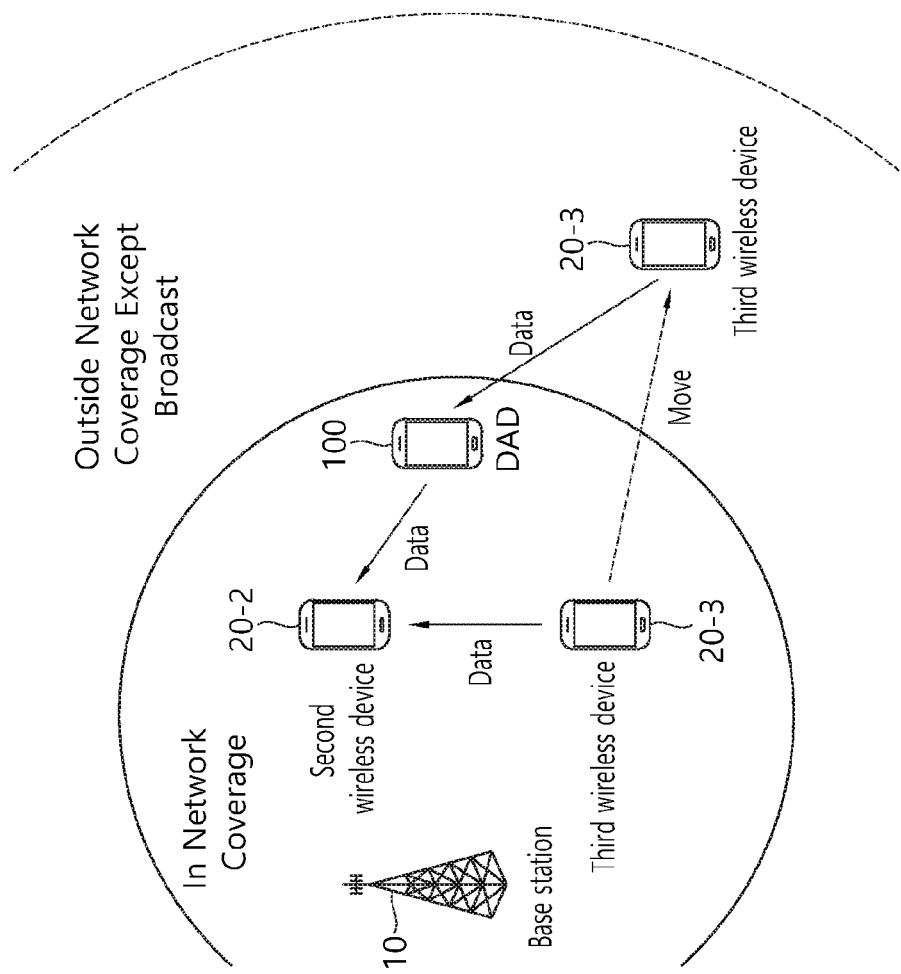
FIG. 14 shows an example in which the DAD supports the connectivity of the D2D communication in the PNC region.

FIG. 14 shows an example in which the DAD supports the connectivity of the D2D communication in the PNC region.

Referring to FIG. 14, it is assumed the third wireless device 20-3 transmits data to the second wireless device 20-2, and the second wireless device 20-2 receives the data from the third wireless device 20-3.

The DAD 100 monitors the D2D communication between the second wireless device 20-2 and the third wireless device 20-3.

When the third wireless device 20-3 moves such that the D2D communication link is terminated, the DAD 100 receives the necessary data from the third wireless device 20-3. The DAD 100 transmits again the necessary data received from the third wireless device 20-3 to the second wireless device 20-2. That is, the DAD 100 operates like a proxy. In this case, as the user of the second wireless device 20-2 does not recognize the fact that the D2D communication link with the third wireless device 20-3 has been terminated, the user of the second wireless device 20-2 may misunderstand that the device 20-2 continues to receive the data from the third wireless device 20-3.

When the DAD 100 detects that another wireless device has the data that the second wireless device 20-2 is receiving, the DAD 100 transmits a control signal to said another wireless device to instruct said another wireless device to transmit the necessary data to the second wireless device 20-2. In this connection, said another wireless device may in advance receive the necessary data from the third wireless device 20-3 before the D2D communication link between the second wireless device 20-2 and the third wireless device (20-3) is terminated. However, the present invention is not limited thereto. Accordingly, the DAD 100 may support the connectivity of the D2D communication so that the second wireless device 20-2 may continuously receive the necessary data.

Figure 15:
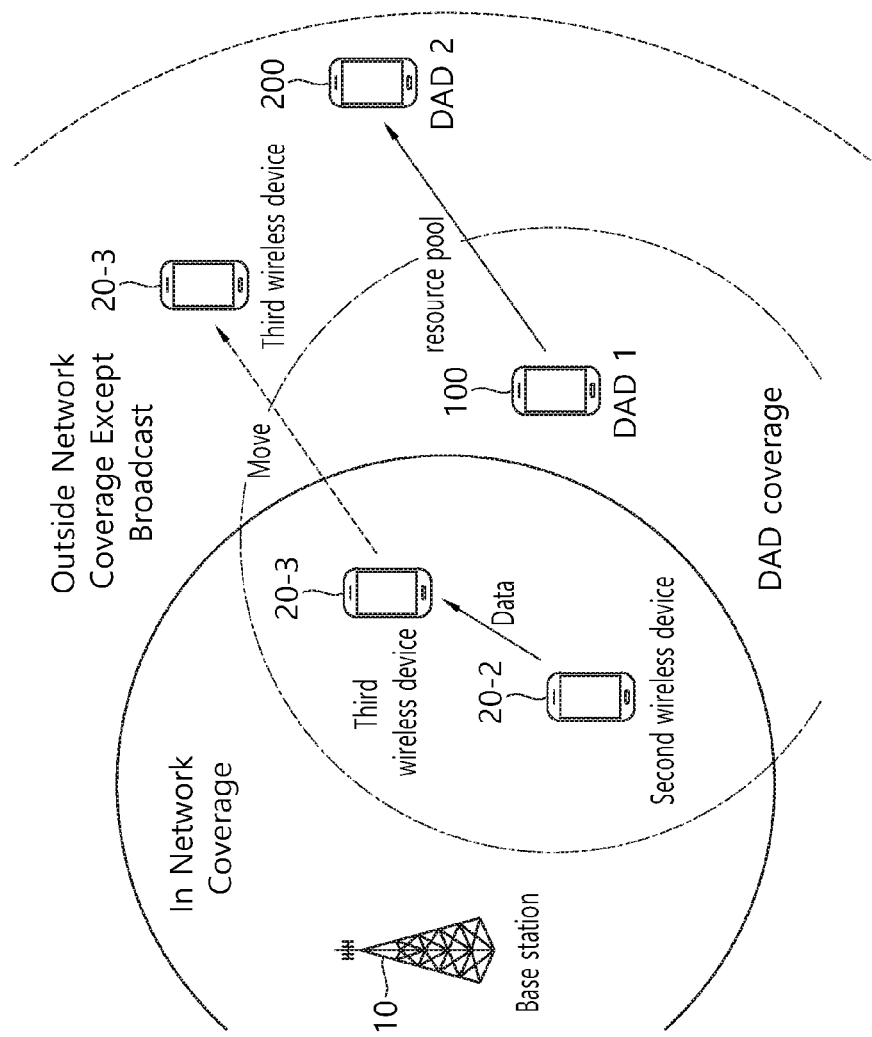
FIG. 15 shows another example in which the DAD supports the connectivity of the D2D communication in the PNC region.

FIG. 15 shows another example in which the DAD supports the connectivity of the D2D communication in the PNC region.

Referring to FIG. 15, it is assumed the second wireless device 20-2 transmits data to the third wireless device 20-3, and the third wireless device 20-3 receives the data from the second wireless device 20-2.

A first DAD 100 monitors the D2D communication between the second wireless device 20-2 and the third wireless device 20-3.

When the third wireless device 20-3 moves such that the D2D communication link is terminated, the third wireless device 20-3 broadcasts a data request message. In this case, the third wireless device 20-3 may broadcast the data request message using information on the resource pools previously received from the base station 10

Since the third wireless device 20-3 is out of the coverage area of the first DAD 100, the first DAD 100 allows an adjacent second DAD 200 thereto to support connectivity of the third wireless device 20-3. To this end, the first DAD 100 may send followings to the adjacent second DAD 200: identification information of the third wireless device 20-3, information about the data being transmitted to the third wireless device 20-3, and information on the resource pools associated with the third wireless device 20-3.

When the second DAD 200 cannot transmit the requested data to the third wireless device 20-3, the second DAD 200 allows an adjacent third DAD (not shown) thereto to support connectivity of the third wireless device 20-3. To this end, the second DAD 200 may send followings to the adjacent third DAD: identification information of the third wireless device 20-3, information about the data being transmitted to the third wireless device 20-3, and information on the resource pools associated with the third wireless device 20-3. Accordingly, the DADs 100 and 200 may support the connectivity of the D2D communication so that the second wireless device 20-2 may continuously receive the data.

Figure 16:
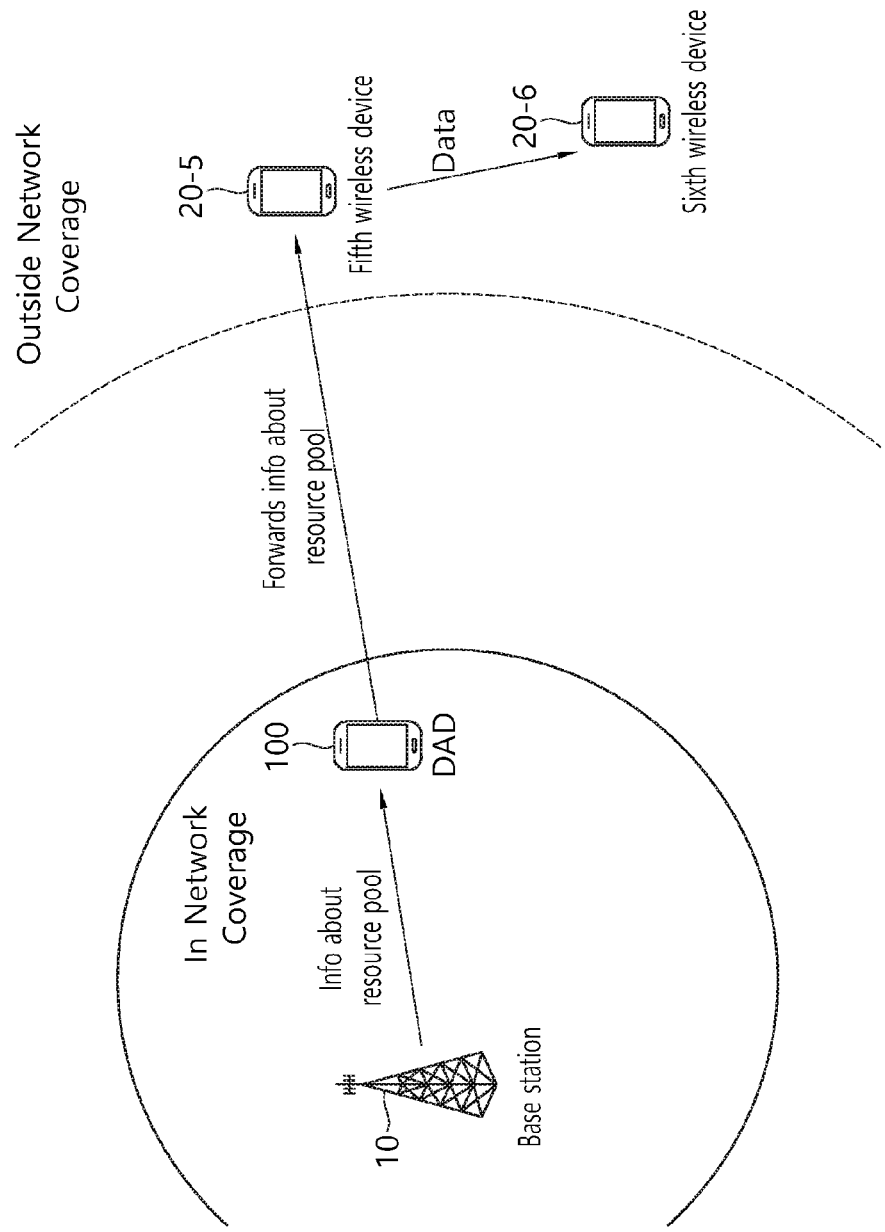
FIG. 16 shows an example in which the DAD supports the connectivity of the D2D communication in the ONC region.

FIG. 16 shows an example in which the DAD supports the connectivity of the D2D communication in the ONC region.

Referring to FIG. 16, it is assumed that a fifth wireless device 20-5 attempts to transmit data to the sixth wireless device 70, and the sixth wireless device 70 receives the data from the fifth wireless device 20-5.

The DAD 100 forwards information on the resource pools received from the base station to the fifth wireless device 20-5. In particular, the DAD 100 may forward the information about the resource pools in response to a request from the fifth wireless device 20-5. However, the present invention is not limited thereto. In one example, the DAD 100 may actively check the D2D communication state between the fifth wireless device 20-5 and the sixth wireless device 70 and then forward the information about the resource pools based on the checking result.

The fifth wireless device (20-5) broadcasts a D2D discovery notification based on the information on the resource pools. The sixth wireless device 70 receives the D2D discovery notification broadcast from the fifth wireless device 20-5, and establishes the D2D communication link with the fifth wireless device 20-5.

Then, the fifth wireless device (20-5) and the sixth wireless device (70) may transmit and receive the data using the established D2D communication link.

Figure 17:
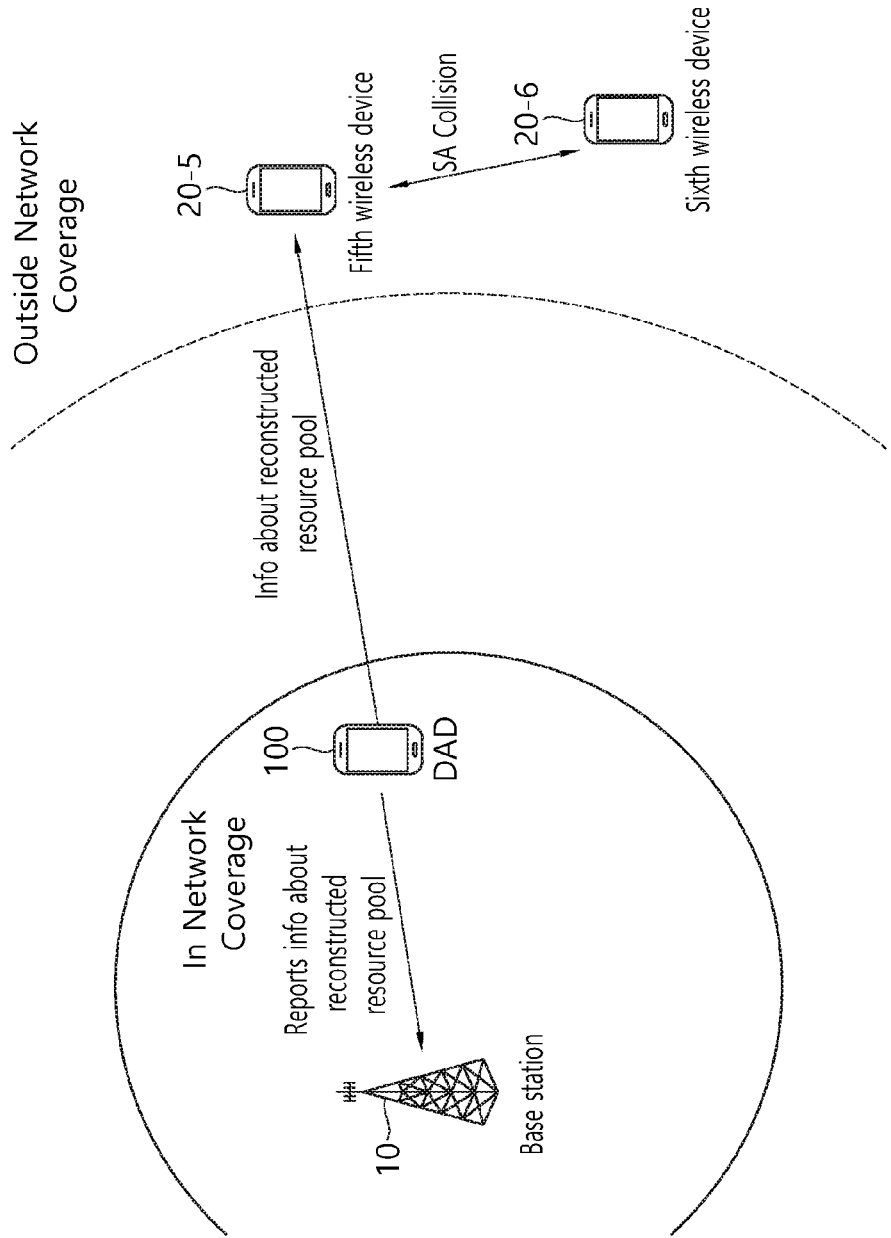
FIG. 17 shows another example in which the DAD supports the connectivity of the D2D communication in the ONC region.

FIG. 17 shows another example in which the DAD supports the connectivity of the D2D communication in the ONC region.

Referring to FIG. 17, it is assumed that although the fifth wireless device 20-5 attempts to transmit data to the sixth wireless device 70, scheduling assignments SA of the fifth wireless device 20-5 and the sixth wireless device 70 conflict with each other, and, thus, the D2D communication link therebetween cannot be established.

The DAD 100 detects the collision of the scheduling assignments SA of the fifth wireless device 20-5 and the sixth wireless device 70.

Based on the information on the resource pools received from the base station 10, the DAD 100 regenerates new resource pools such that the scheduling assignments SA of the fifth wireless device 20-5 and the sixth wireless device 70 may not conflict with each other. Then, the DAD 100 broadcasts information about the regenerated resource pools.

The fifth wireless device 20-5 located within the coverage area of the DAD 100 receives the information about the regenerated resource pools. Then, the fifth wireless device 20-5 broadcasts the D2D discovery notification based on the information about the regenerated resource pools.

The sixth wireless device 70 receives the D2D discovery notification broadcast from the fifth wireless device 20-5 and establishes the D2D communication link with the fifth wireless device 20-5. Then, the fifth wireless device (20-5) and the sixth wireless device (70) may transmit and receive the data using the established D2D communication link.

When moved to the INC area, the DAD 10 reports to the base station 10 information about the D2D communication between the fifth wireless device 20-5 and the sixth wireless device 70. Specifically, the DAD 100 reports to the base station 10 information about movement of the fifth wireless device 20-5 and the sixth wireless device 70, information about the collision between the scheduling assignments SA, and information about the regenerated resource pools.

Figure 18:
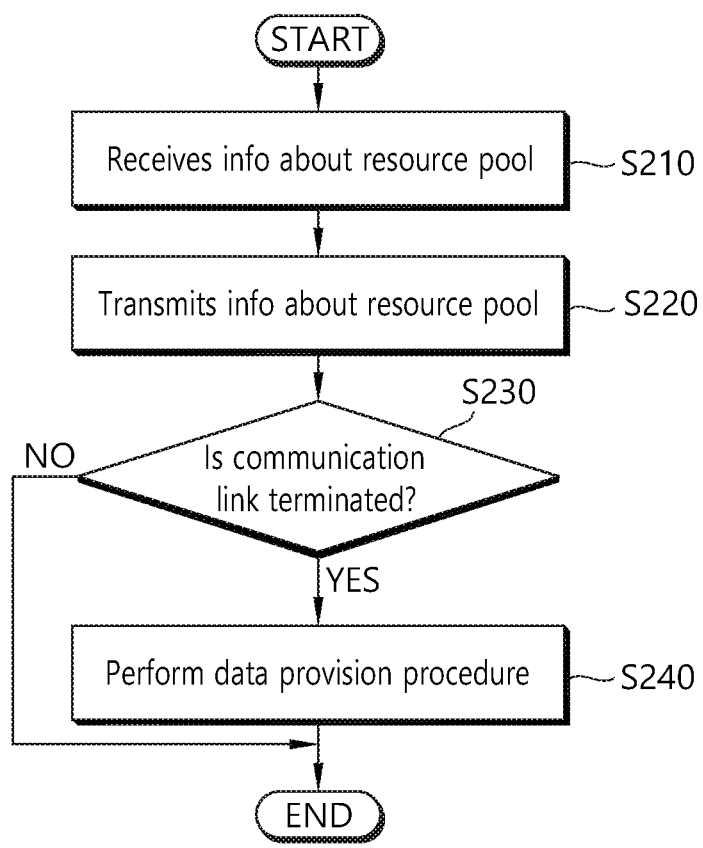
FIG. 18 shows a method for supporting D2D communication according to one embodiment of the present invention.

FIG. 18 shows a method for supporting D2D communication according to one embodiment of the present invention.

Referring to FIG. 18, the DAD 100 receives information on resource pools available for D2D communication from the base station 10 S210. In this connection, the DAD 100 may be located in the ONC-B region relative to the base station 10. However, the present invention is not limited thereto.

The DAD 100 receives the information on the resource pools available for the D2D communication and transmits to a first wireless device and a second wireless device information on resource pools available for D2D communication between the first wireless device and the second wireless device S220. In this connection, the first wireless device and the second wireless device may be located in the ONC region relative to the base station 10. However, the present invention is not limited thereto.

The DAD 100 determines whether the D2D communication link between the first wireless device and the second wireless device is terminated S230. Upon determination that the D2D communication link between the first wireless device and the second wireless device is terminated, the DAD 100 performs a procedure for providing necessary data to the second wireless device S240. More specifically, before the D2D communication link between the first wireless device and the second wireless device is terminated, the DAD 100 has received in advance the necessary data from the first wireless device. The DAD 100 may transmit the received necessary data to the second wireless device.

The DAD 100 searches for a third wireless device which is adjacent to the second wireless device, and which has received the necessary data before the D2D communication link between the first wireless device and the second wireless device was terminated. When the third wireless device is detected, the DAD 100 may transmit a control signal to the third wireless device to instruct the third wireless device to transmit the necessary data to the second wireless device.

When the second wireless device broadcasts a data request message, the DAD 100 determines whether the data request message reaches the third wireless device having the necessary data. Upon determination that the data request message does not reach the third wireless device, the DAD 100 may send a power adjustment signal to the second wireless device to instruct the second wireless device to increase the transmission power for the data request message.

The DAD 100 determines whether the third wireless device having the necessary data is located in an area where the third wireless device cannot directly receive the information on the resource pools from the base station 10. Upon determination that the third wireless device is located in the area where the third wireless device cannot directly receive the information on the resource pools from the base station 10, the resource pools are updated so that the D2D communication link may be established between the second wireless device and the third wireless device. The DAD 100 may send the updated resource pools to the second wireless device. The DAD 100 may report information about the updated resource pools to the base station 10.

The DAD 100 receives from the second wireless device, priorities for devices that will support the connectivity of the D2D communication. The DAD 100 may transmit the necessary data to the second wireless device when the DAD 100 corresponds to a device to provide connectivity support of the D2D communication based on the received priorities.

When a collision between the scheduling assignments for the D2D communication between the first wireless device and the second wireless device is detected by the DAD 100, the DAD 100 may regenerate the resource pools so that the collision between the scheduling assignments is suppressed. The DAD 100 may transmit the regenerated resource pools to one or more of the first wireless device and the second wireless device. Then, the DAD 100 may report information on the regenerated resource pools to the base station 10.

Figure 19:
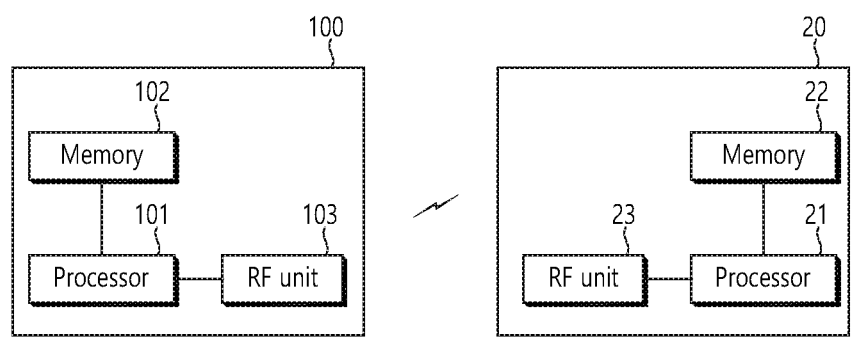
FIG. 19 is a block diagram illustrating a D2D communication support system in which the present invention is implemented.

FIG. 19 is a block diagram illustrating a D2D communication support system in which the present invention is implemented.

The DAD 100 includes a processor 101, a memory 102 and an RF unit (radio frequency unit) 103. The memory 102 is connected to the processor 101 and stores various information for driving the processor 101. The RF unit 103 is connected to the processor 101 to transmit and/or receive a radio signal. The processor 101 implements the functions, processes and/or methods proposed in accordance with the present invention. The operations of the DAD 100 in the above-described embodiments may be implemented by the processor 101.

A wireless device 20 includes a processor 21, a memory 22, and an RF unit 23. The memory 22 is connected to the processor 21 to store various information for driving the processor 21. The RF unit 23 is connected to the processor 110 to transmit and/receive a wireless signal. The processor 21 implements a suggested function, procedure, and/or method. An operation of the wireless according to the above embodiment may be implemented by the processor 21.

A processor 101, 21 may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for supporting connectivity of D2D (Device-to-Device) communication between a first wireless device and a second wireless device, the method performed by a third wireless device and comprising:

receiving first information on a first resource pool available for D2D communication from a base station;

transmitting the second information on a second resource pool to the first wireless device and the second wireless device, wherein the second resource pool includes resources available for the D2D communication between the first wireless device and the second wireless device;
monitoring a D2D communication link between the first wireless device and the second wireless device;
receiving data from the first wireless device,
wherein the data is generated by the first wireless device and intended to be delivered to the second wireless device;
determining whether the D2D communication link between the first wireless device and the second wireless device is terminated based on a result of the monitoring; and
providing the data to the second wireless device when the D2D communication link is terminated and the data is received before the D2D communication link is terminated.

2. The method of claim 1,
wherein the third wireless device is located in a cell coverage extension area of the base station,
wherein the first wireless device and the second wireless device are out of the cell coverage extension area.

3. The method of claim 1, wherein the first information is received repeatedly from the base station using a plurality of subframes.

4. The method of claim 1, wherein the providing the data includes:
searching for a fourth wireless device adjacent to the second wireless device,
wherein the fourth wireless device has received the data before the D2D communication link between the first wireless device and the second wireless device is terminated; and
upon detection of the fourth wireless device, transmitting to the fourth wireless device, a control signal for instructing the fourth wireless device to transmit the data to the second wireless device.

5. The method of claim 1, wherein the providing the data includes:
upon the second wireless device broadcasting a data request message, determining whether the data request message reaches a fourth wireless device containing the data; and
upon determination that the data request message does not reach the fourth wireless device, transmitting a power adjustment signal to the second wireless device to instruct the second wireless device to increase transmission power for the data request message.

6. The method of claim 1, wherein the providing the data includes:
determining whether a fourth wireless device having the required data is located in an area where the first information cannot be received directly from the base station;
upon determination that the fourth wireless device is located in the area, updating the resource pool so that a D2D communication link is established between the second wireless device and the fourth wireless device; and
sending the updated resource pool to the second wireless device.

7. The method of claim 6, further comprising:
reporting information on the updated resource pool to the base station.

8. The method of claim 1, wherein the providing the data includes:
receiving support priorities for devices supporting the connectivity of the D2D communication from the second wireless device; and
upon determining, based on the received support priorities, that the third wireless device is to support the connectivity of the D2D communication, transmitting the data to the second wireless device.

9. The method of claim 1, further comprising:
when a collision between scheduling assignments for the D2D communication between the first wireless device and the second wireless device is detected based on the result of the monitoring, reconstructing the resource pool so that the collision is prevented; and
transmitting the reconstructed resource pool to one of the first wireless device or the second wireless device.

10. The method of claim 9, further comprising:
reporting information on the reconstructed resource pool to the base station.

11. A support device for supporting connectivity of D2D (Device-to-Device) communication between a first wireless device and a second wireless device, the support device comprising:
a transceiver; and
a processor operatively coupled to the transceiver and configured to control the transceiver, wherein the processor is further configured to:
control the transceiver to receive first information on a resource pool available for D2D communication from a base station;
control the transceiver to transmit the second information on the resource pool to the first wireless device and the second wireless device,
wherein the second resource pool includes resources available for the D2D communication between the first wireless device and the second wireless device;
monitor a D2D communication link between the first wireless device and the second wireless device;
control the transceiver to receive data from the first wireless device,
wherein the data is generated by the first wireless device and intended to be delivered to the second wireless device;
determine, whether the D2D communication link between the first wireless device and the second wireless device is terminated based on a result of the monitoring; and
control the transceiver to provide the data to the second wireless device when the D2D communication link is terminated and the data is received before the D2D communication link is terminated.

12. The support device of claim 11,
wherein the support device is located in a cell coverage extension area of the base station,
wherein the first wireless device and the second wireless device are out of the cell coverage extension area.

13. The support device of claim 11,
wherein the processor is further configured to search for a fourth wireless device adjacent to the second wireless device, the fourth wireless device being a device that has received the data before the D2D communication link between the first wireless device and the second wireless device is terminated; and
upon detection of the fourth wireless device, control the transceiver to transmit, to the fourth wireless device, a control signal instructing the fourth wireless device to transmit the data to the second wireless device.

14. The support device of claim 11, wherein the processor is further configured to:
   upon the second wireless device broadcasting a data request message, determine whether the data request message reaches a fourth wireless device containing the data; and
   upon determination that the data request message does not reach the fourth wireless device, control the transceiver to transmit a power adjustment signal to the second wireless device to instruct the second wireless device to increase transmission power for the data request message.

15. The support device of claim 11, wherein the processor is further configured to:
   determine whether a fourth wireless device having the data is located in an area where the first information cannot be received directly from the base station;
   upon determination that the fourth wireless device is located in the area, update the resource pool so that a D2D communication link is established between the second wireless device and the fourth wireless device; and
   control the transceiver to transmit the updated resource pool to the second wireless device.

16. The support device of claim 15, wherein the processor is further configured to control the transceiver to report information on the updated resource pool to the base station.

17. The support device of claim 11, wherein the processor is further configured to:
   control the transceiver to receive support priorities for devices supporting the connectivity of the D2D communication from the second wireless device; and
   upon determining, based on the received support priorities, that the third wireless device is to support the connectivity of the D2D communication, control the transceiver to transmit the data to the second wireless device.

18. The support device of claim 11, wherein the processor is further configured to:
   when a collision between scheduling assignments for the D2D communication between the first wireless device and the second wireless device is detected based on the result of the monitoring, reconstruct the resource pool so that the collision is prevented; and
   control the transceiver to transmit the reconstructed resource pool to one of the first wireless device or the second wireless device.

19. The support device of claim 18, wherein the processor is further configured to control the transceiver to report information on the reconstructed resource pool to the base station.

* * * * *